United States Patent
Ito

(10) Patent No.: US 8,074,183 B2
(45) Date of Patent: Dec. 6, 2011

(54) IMAGE FORMATION DEVICE AND ITS CONTROL METHOD

(75) Inventor: Sakae Ito, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 315 days.

(21) Appl. No.: 11/480,502

(22) Filed: Jul. 5, 2006

(65) Prior Publication Data

US 2007/0067730 A1    Mar. 22, 2007

(30) Foreign Application Priority Data

Sep. 22, 2005 (JP) ................................. 2005-276557

(51) Int. Cl.
*G06F 3/048* (2006.01)

(52) U.S. Cl. .................. 715/853; 715/705; 715/710

(58) Field of Classification Search .............. 715/853, 715/705–714, 735, 809
See application file for complete search history.

(56) References Cited

U.S. PATENT DOCUMENTS

| | | | |
|---|---|---|---|
| 6,401,230 B1 * | 6/2002 | Ahanessians et al. | 716/1 |
| 6,456,304 B1 * | 9/2002 | Angiulo et al. | 715/779 |
| 2003/0061322 A1 * | 3/2003 | Igarashi et al. | 709/223 |
| 2003/0200371 A1 * | 10/2003 | Abujbara | 710/305 |
| 2005/0024671 A1 * | 2/2005 | Abe | 358/1.13 |

FOREIGN PATENT DOCUMENTS

| | | |
|---|---|---|
| JP | 61080272 A | 4/1986 |
| JP | 11-240229 | 9/1999 |
| JP | 2003103883 A | 4/2003 |
| JP | 2004326426 A | 11/2004 |

OTHER PUBLICATIONS

Japanese Office Action corresponding to Japanese Patent Application No. 2005-276557 dated Aug. 16, 2010.

* cited by examiner

*Primary Examiner* — Weilun Lo
*Assistant Examiner* — Enrique Iturralde
(74) *Attorney, Agent, or Firm* — Sughrue Mion, PLLC

(57) ABSTRACT

An image formation device having a hierarchically structured function setting menu in which plural function setting items including a function setting item for an optional device are managed in a hierarchical structure, the hierarchically structured function setting menu being sequentially displayed according to the hierarchical structure to select a desired function setting item to perform a function setting, the image formation device including a detector that detects a connection of the optional device, and a changing unit that changes the function setting item for the optional device to a top level of the hierarchically structured function setting menu when the connection of the optional device is detected by the detector.

8 Claims, 3 Drawing Sheets

IMAGE FORMATION DEVICE AND ITS CONTROL METHOD

BACKGROUND OF THE INVENTION

1. Field of the Invention

The present invention relates to an image formation device and its control method, and particularly to an image formation device and its control method which are designed to selectively display an optimal menu screen according to the connection status of an optional device connected to the image formation device having an operation panel formed by an LCD (liquid crystal display) or the like, and thus are capable of improving its usability for operators.

2. Description of the Related Art

An operation screen is displayed on an LCD (liquid crystal display) of an operation panel provided in an image formation device such as a copier, a printer, or a facsimile. Conventionally, this operation screen includes plural menu screens formed in a hierarchical structure. A desired menu option is selected on an initially displayed menu screen. If the selected menu option includes further options to be selected, a subsequent selection menu screen is displayed to display those menu options. The selection menu screens are displayed sequentially in this manner to allow the user to select a desired menu options thereon.

The display sequence of the operation screens having such a hierarchical structure is preset before factory shipment of the image formation device. A function setting menu screen also has a hierarchical structure in which plural function setting items including those of optionally connected devices are managed by the hierarchical structure, and the function setting menu screens are sequentially displayed according to the preset hierarchical structure regardless of the connection status of an optional device connected by the user to the image formation device.

When the user performs a predetermined operation using such operation screens that are displayed in the preset sequence according to the hierarchical structure, a function setting menu screen may be displayed on the LCD to prompt the user to select whether a certain optional device is to be used or not even though no such optional device is connected to the image formation device. This causes a problem in usability.

Therefore, there is a demand for a method to display an operation screen in a highly usable manner, with its hierarchical structure being optimized according to the connection status of an optional device connected to the image formation device. For example, Japanese Patent Application Laid-Open No. 11-240229 proposes a recording system the usability of which is improved by optimizing the hierarchical structure of menus displayed on a display panel such as an LCD according to the connection status of an optionally connected apparatus.

The recording system proposed by Japanese Patent Application Laid-Open No. 11-240229 is designed to optimize an optimal operation menu for an optional device such as an automatic cutter or a barcode verifier connected thereto, that is displayed by an LCD for the system user, by the method of detecting the connection status of the optional device by means of a sensor and an I/O port, and dynamically changing the hierarchical structure of the operation menu according to a result of the detection.

In the recording system described in Japanese Patent Application Laid-Open No. 11-240229, however, if the optional device requires various settings to be performed on the display panel before using the same, these settings are added into the menu regardless of whether or not the optional device is connected. Thus, the recording system has a problem in the usability in the default settings.

SUMMARY OF THE INVENTION

The present invention has been made in view of the above circumstances and provides an image formation device and its control method, which are designed to selectively display an optimal menu screen according to the connection status of an optional device connected to the image formation device having an operation panel such as an LCD (liquid crystal display) for improving the usability for operators.

An aspect of the invention provides an image formation device having a hierarchically structured function setting menu in which plural function setting items including a function setting item for an optional device are managed in a hierarchical structure, the hierarchically structured function setting menu being sequentially displayed according to the hierarchical structure to select a desired function setting item to perform a function setting, the image formation device including a detector that detects a connection of the optional device, and a changing unit that changes the function setting item for the optional device to a top level of the hierarchically structured function setting menu when the connection of the optional device is detected by the detector.

Another aspect of the invention provides a control method for an image formation device having a hierarchically structured function setting menu in which plural function setting items including a function setting item for an optional device are managed in a hierarchical structure, the hierarchically structured function setting menu being sequentially displayed according to the hierarchical structure to select a desired function setting item to perform a function setting, the control method including detecting, by a detector, whether or not the optional device is connected, and changing, by a changing unit, the function setting item for the optional device to a top level of the hierarchically structured function setting menu when the detector detects the connection of the optional device.

BRIEF DESCRIPTION OF THE DRAWINGS

An embodiment of the present invention will be described in detail based on the following figures, wherein.

DETAILED DESCRIPTION OF THE INVENTION

An embodiment of the present invention will be described in detail based on the accompanying figures.

Figure 1:
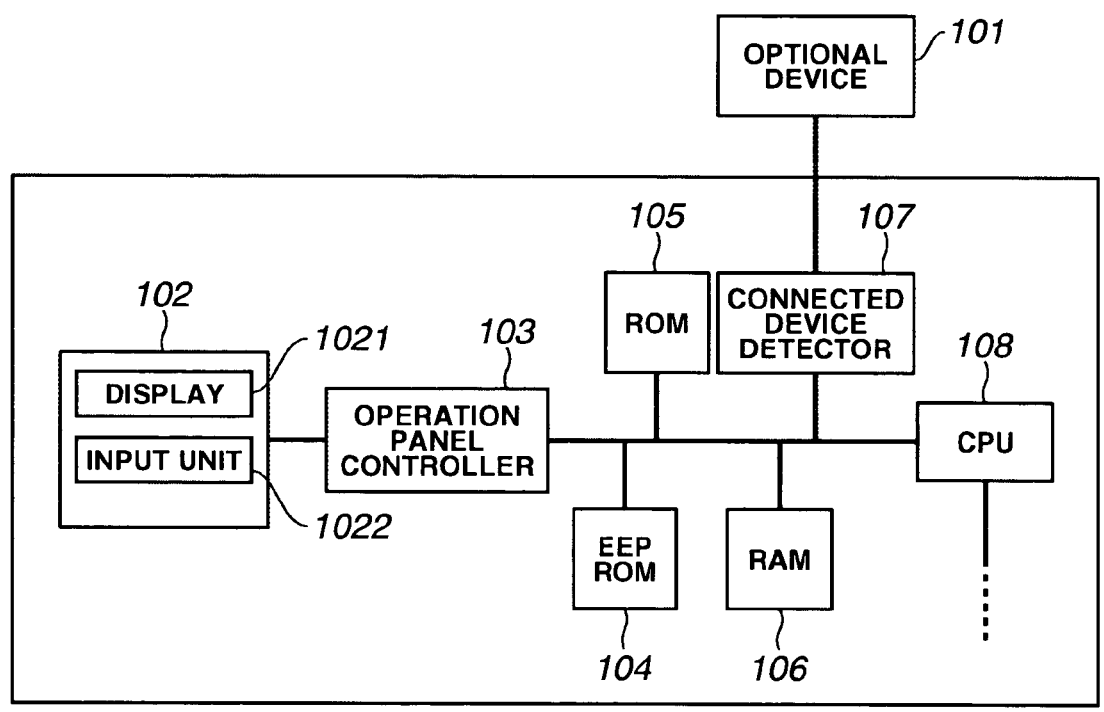
FIG. 1 is a block diagram showing a functional configuration of a principal part of an image formation device 100 according to the present invention.

FIG. 1 is a block diagram showing a functional configuration of a principal part of an image formation device 100 according to the present invention.

In FIG. 1, configurations of functions not relevant to the present invention are omitted for the sake of convenience of description below. These functions include an image processing function performed by the image formation device 100 to process image data received thereby to print out the image data on paper, and an image formation function to print out the processed image data on paper including the conveyance of the paper.

The image formation device 100 according to the present invention is, for example, a copier, a printer, or a facsimile, having an operation panel such as an LCD (liquid crystal display). As shown in FIG. 1, the image formation device 100 is designed such that an expansion device such as an LAN board or expansion memory, or, if the image formation device 100 is a printer, an additional device such as a duplex printing unit or manual paper feeding unit (hereafter, the additional device and the expansion device shall be generally referred to as the "optional device 101") can be additionally connected to the image formation device 100.

FIG. 1 shows the condition in which an optional device 101 is connected to the image formation device 100.

When the optional device 101 is connected to the image formation device 100, power is supplied to the optional device 101 via the image formation device 100 upon establishment of electrical connection between the optional device 101 and the image formation device 100.

The power supply to the image formation device 100 should be turned off before connecting the optional device 101 to the image formation device 100 for the sake of the security of the optional device 101 and the image formation device 100. The power supply to the image formation device 100 is turned on only after the connection of the optional device 101 to the image formation device 100.

The image formation device 100 includes an operation panel 102, an operation panel controller 103, an EEPROM 104 (nonvolatile memory), a ROM 105, a RAM 106, a connected device detector 107, and a CPU 108.

The CPU 108 is a central processing unit which controls various parts and components of the image formation device 100 and also controls the image formation device 100 as a whole.

The ROM 105 stores a control program executed by the CPU 108 to control the components and the entire of the image formation device 100.

The RAM 106 temporarily stores various data involved by operation control of the image formation device 100.

The connected device detector 107 detects whether or not an optional device 101 is connected to the image formation device 100. When the optional device 101 is connected to the image formation device 100, the connected device detector 107 identifies the model of the optional device 101, and performs interface control on the exchange of data signals and control signals between the optional device 101 and the image formation device 100.

The operation panel 102 includes a display 1021 such as an LCD (liquid crystal display) and an input unit 1022 such as a key switch for performing various functional settings. The display 1021, which has a small display area with limited display capacity, adopts a hierarchical structure for displaying menus for various function settings or selections of menu options. According to the hierarchically structured menu display, the displayed menu screen is changed successively to those for subsequently available menu options or setting items according to the option or item selected on the initial menu screen.

The EEPROM 104, which is an electrically rewritable ROM, stores setting information for the information image formation device 100, screen data to be displayed on the operation panel 102, and information on the optional device 101 connected to the image formation device 100 (e.g., setting data on various functions of various optional devices 101 and optional device information for respective models of the devices).

The operation panel controller 103 controls the operation of the display 1021 and the input unit 1022 of the operation panel 102.

More specifically, the operation panel controller 103 controls the display of a menu screen to be displayed on the operation panel 102, on the basis of the connection status of the optional device 101 connected to the image formation device 100, the setting data of various functions stored in the EEPROM 104, and the screen data. The operation panel controller 103 performs various other controls based on input information, including the control of the transfer of information on instructions made by the operator using the input unit 1022 (for example, information on the item selected on the menu screen or various other input data) to the parts of the image formation device requiring such information.

A description will be made, with reference to the flowchart of FIG. 2 and examples of the menu screens shown in FIGS. 3A to 3C, on a control method for improving the operator's usability, in which the image formation device 100 selectively displays an optimal menu on the operation panel 102 according to the connection status of the optional device 101.

Figure 2:
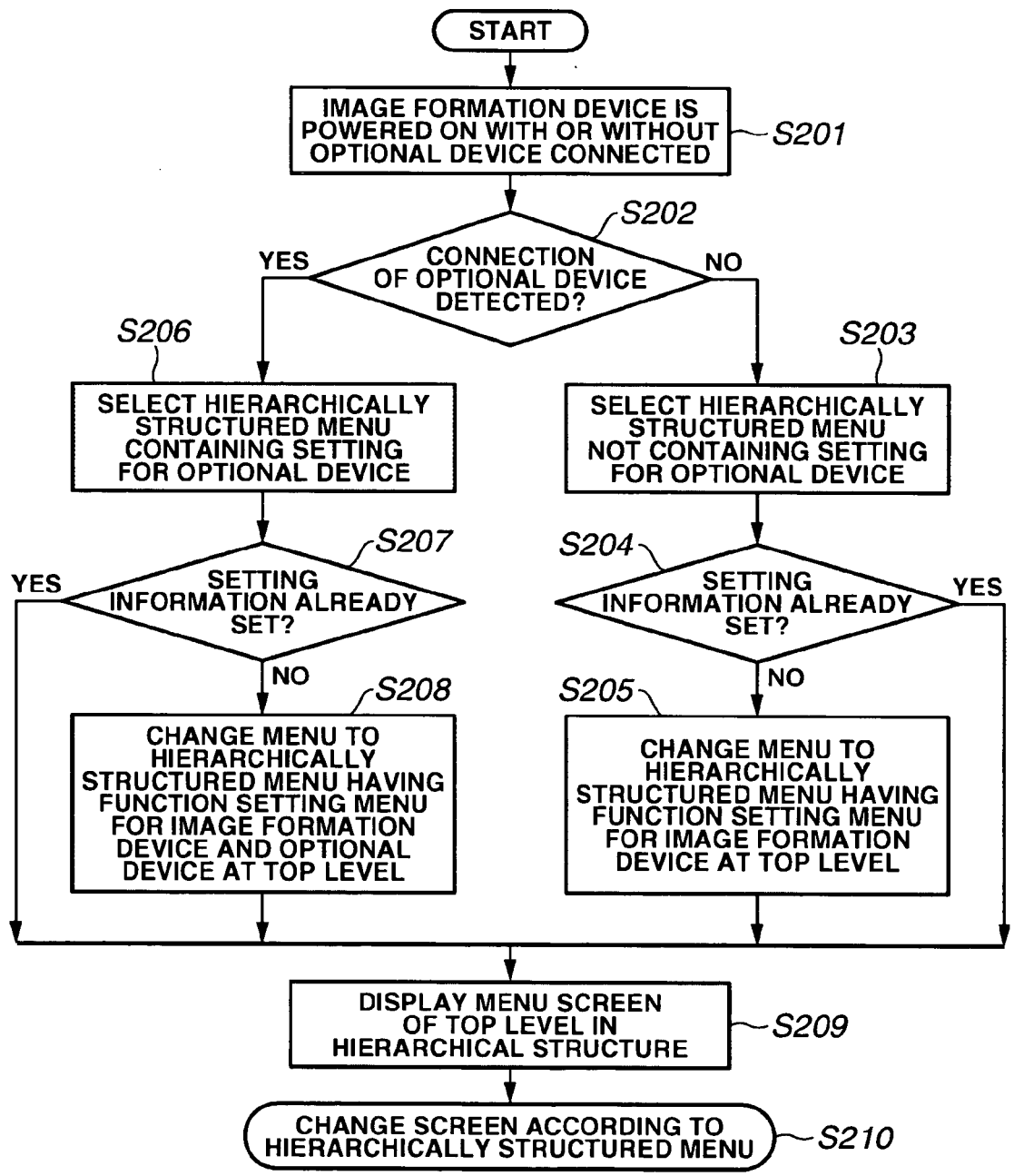
FIG. 2 is a flowchart of a method in which the image formation device 100 displays an optimal menu screen according to the connection status of an optional device 101.

As shown in FIG. 2, when the image formation device 100 is powered on by the operator with or without an optional device 101 connected to the image formation device 100 (step S201), the connected device detector 107 of the image formation device 100 detects whether or not the optional device 101 is connected to the image formation device 100 (step S202), and informs the operation panel controller 103 of the detection result.

When the optional device 101 is connected to the image formation device 100, the optional device 101 and the image formation device 100 are connected by means of an electrical sense signal. Therefore, the connected device detector 107 is capable of detecting that the optional device 101 is connected to the image formation device 100 based on a detection signal of the optional device 101 at an I/O port (not shown) of the connected device detector 107.

If the connected device detector 107 does not detect the connection of the optional device 101 (NO in step S202), the operation panel controller 103 selects and retrieves, based on the detection result, a hierarchically structured menu not containing a function setting menu of the optional device 101 from the EEPROM 104 (step S203).

The EEPROM 104 is designed to store various screen data and setting information for setting an operation method or various functions (functions including density adjustment and energy-saving mode operation, for example) of the image formation device 100. Additionally, the EEPROM 104 also stores various screen data, for example of a function setting menu screen used for setting functions of optional devices 101 additionally connectable to the image formation device 100, and setting information of the optional devices 101. If no optional device 101 is connected to the image formation device 100, the operation panel controller 103 selects and retrieves a hierarchically structured menu not containing a function setting menu screen used for performing settings for the optional device 101.

The operation panel controller 103 retrieves setting information data for the image formation device 100 from the region of EEPROM 104 storing this setting information, and determines, based on the retrieved setting data, whether the function settings for the image formation device 100 is performed or not (step S204).

If it is determined that the function settings is performed for the image formation device 100 in step S204 (YES in step S204), the operation panel controller 103 performs control so that a menu screen containing the setting information of the image formation device 100 and located at the top level of the hierarchically structured menu is displayed on the display 1021 of the operation panel 102. As shown in FIG. 3A, for example, this menu screen displays the message "Ready to print", that is normally displayed upon the power-on of the image formation device 100 (step S209).

When the operator presses the menu button on the input unit 1022, for example, while the menu screen is in this state, various menu screens are displayed hierarchically in response to the operator's selection so that the operator is allowed to set various functions of image formation device or to confirm or edit the setting information (step S210).

If it is determined, in step S204, that the function settings for the image formation device 100 is not performed (NO in step S204), the operation panel controller 103 performs control so that a function setting menu screen prompting the operator to set function setting items for the image formation device 100 which is not set is changed to the top level of the hierarchically structured menu and displayed on the display 1021 of the operation panel 102 (step S205, step S209). The operator is thus prompted to perform function settings for the image formation device 100, and then various menu screens are hierarchically displayed according to the setting operation by the operator (step S210).

If the connection of an optional device 101 is detected in step S202 by the connected device detector 107 (YES in step S202), the operation panel controller 103 selects and retrieves, based on the detection result, the hierarchically structured menu containing a function setting menu screen for the optional device 101, from the EEPROM 104 (step S206).

Further, the operation panel controller 103 retrieves setting information data on the optional device 101 detected by the connected device detector 107 from the region of the EEPROM 104 in which the setting information for the optional device 101 is stored, and determines whether the function setting for the optional device 101 is performed or not based on the retrieved setting data (step S207).

If it is determined in step S207 that the function setting for the optional device 101 is performed (YES in step S207), the operation panel controller 103 performs control so that a menu screen corresponding to the hierarchically structured menu containing the setting information for the optional device 101 connected to the image formation device 100 is displayed on the display 1021 of the operation panel 102 (step S209).

Figure 3A:
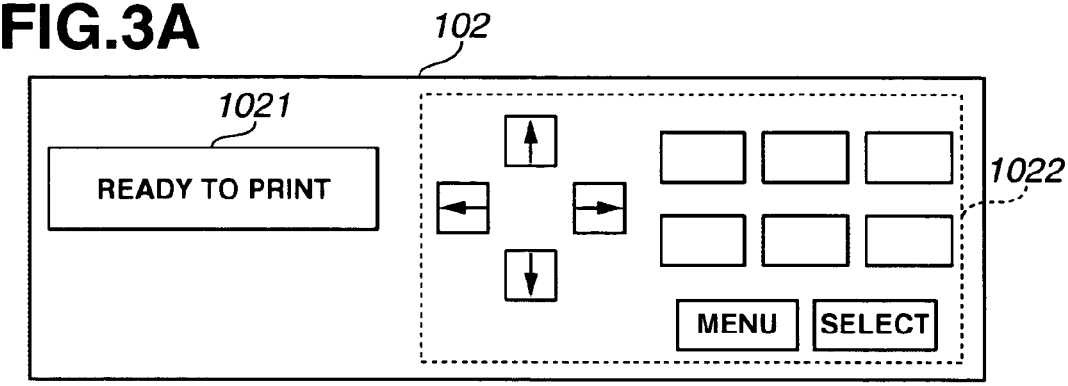
FIGS. 3A to 3C illustrate examples of a menu screen displayed on an operation panel 102.
Figure 3B:
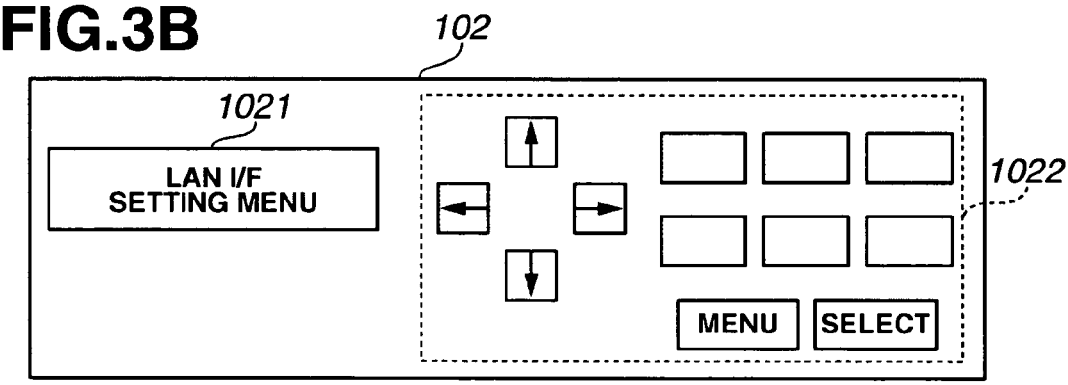
Figure 3C:
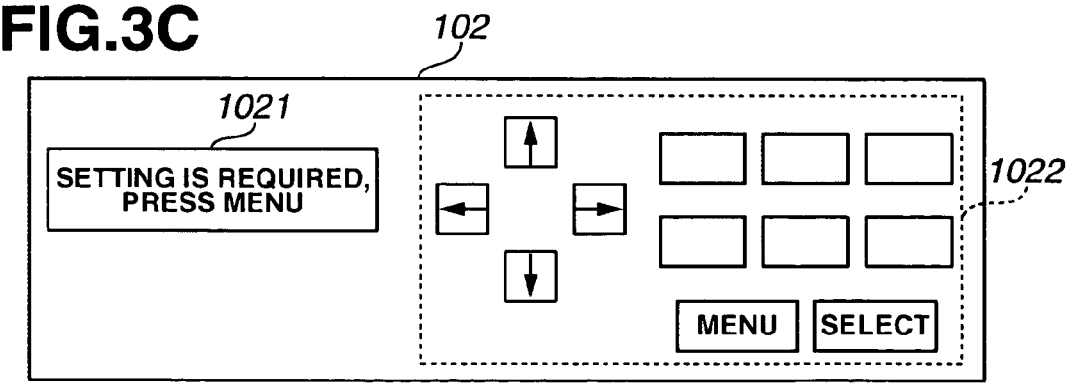

More specifically, the hierarchically structured menu displayed on the display 1021 of the operation panel 102 is such that the message display screen showing the message "Ready to print" as shown in FIG. 3A is displayed as the top level menu of the hierarchical structure, and a next-level menu screen subsequently displayed allows the operator to set various functions of the optional device 101 connected to the image formation device 100, such as the display, editing and deletion of the setting information.

When the operator presses the "menu" button on the input unit 1022 with the message "Ready to print" displayed on the display 1021, a menu screen (not shown) associated with the pressing of the menu button is displayed, showing setting information of the optional device 101. The operator is thus enabled to set various functions of the optional device 101 such as the display, editing and deletion of the setting information by selecting setting information for the optional device 101 shown on the menu screen.

If it is determined in step S207 that the function setting for the optional device 101 is not performed (NO in step S207), the operation panel controller 103 performs control so that the function setting menu screen prompting the operator to perform function setting for the optional device 101 is changed to the top level of the hierarchically structured menu and is displayed on the display 1021 of the operation panel 102 to prompt the operator to perform the function setting for the optional device 101 (steps S208 and step S209).

More specifically, when a LAN board is additionally connected to the image formation device 100, for example, the LAN board connected to the image formation device 100 is detected by the connected device detector 107. The operation panel controller 103 retrieves, based on the detection result, setting information for the LAN board from the region of the EEPROM 104 in which the LAN board setting information is stored. If the operation panel controller 103 determines, based on the retrieved setting information, that the function setting for the LAN board is not performed, the operation panel controller 103 then changes the hierarchically structured menu to the one in which an "LAN I/F setting menu" screen as shown in FIG. 3B is contained at the top level, and displays the "LAN I/F setting menu" screen on the display 1021 of the operation panel 102 to prompt the operator to perform the function settings for the LAN board.

When plural optional devices 101 are connected to the image formation device 100, the operation panel controller 103 determines whether function settings is performed for the optional devices 101. If there is an optional device for which function setting is not performed, the hierarchically structured menu is changed to the one in which "Setting required, press MENU" screen as shown in FIG. 3C is contained as the top level menu, and a function setting menu for the optional device for which the function setting is not performed is contained as the next level menu. The "Setting required, press MENU" screen is then displayed on the display 1021 of the operation panel 102 to prompt the operator to perform the function setting for the optional device 101 for which the function setting is not performed.

The function settings of the various functions are performed by pressing a four-way control key or a button such as a "MENU" key or "SELECT" key in the input unit 1022 in accordance with a function setting menu screen or operation guidance displayed on the display 1021 of the operation panel 102. The setting information of the functions of the image formation device 100 and the setting information of each of the optional devices 101 are stored in respective predetermined storage regions of the EEPROM 104.

In this manner, the image formation device and its control method according to the present invention are able to instantaneously recognize the connection status of an optional device to the image formation device and able to prompt the operator to perform function setting for the connected optional device if the function setting is not performed.

Furthermore, even when the optional device is once disconnected from the image formation device and then connected thereto again, the operator is allowed to quickly check on the operation panel whether the function setting for the connected optional device is done or not in a similar manner as the initial connection thereof.

The description so far has been made in terms of an example in which, when the connection of an optional device 101 to the image formation device 100 is detected and then it is determined that the function setting for the detected optional device 101 is not performed or some of the function setting items for the image formation device 100 are not set, the hierarchically structured menu is changed to the one in which a function setting menu screen prompting the operator to set the unset items for the optional device 101 or the image formation device 100 is displayed as the top level screen. However, the present invention is not limited to this, and the message "Ready to print" that is displayed in the normal state of the image formation device 100 may be replaced with the message "Press ○ x button and set setting item" to prompt the operator to perform function settings for the optional device 101.

In this case, the buttons on the input unit 1022 of the operation panel 102 are associated with processing to display function setting menu screens for performing a function setting for each of the optional devices 101. By pressing a button, a control is performed so that the function setting menu screen for each of the optional device 101 associated thereto is displayed.

A first aspect of the invention provides an image formation device having a hierarchically structured function setting menu in which plural function setting items including a function setting item for an optional device are managed in a hierarchical structure, the hierarchically structured function setting menu being sequentially displayed according to the hierarchical structure to select a desired function setting item to perform a function setting, the image formation device including a detector that detects a connection of the optional device, and a changing unit that changes the function setting item for the optional device to a top level of the hierarchically structured function setting menu when the connection of the optional device is detected by the detector.

A second aspect of the invention provides the image formation device according to the first aspect of the invention, in which the changing unit may further include a determination unit that determines whether or not the function setting is performed for the optional device detected by the detector, the function setting item for the optional device being changed to the top level of the hierarchically structured function setting menu only when the determination unit determines that the function setting is not performed.

A third aspect of the invention provides the image formation device according to the first or second aspect of the invention, which may further include a setting information deleting unit that deletes function setting information for the optional device when the optional device is disconnected.

A fourth aspect of the invention provides the image formation device according to one of the first to third aspects of the invention, in which, when the optional device is not connected, the changing unit may change function setting items for which the function setting is not performed in the hierarchically structured function setting menu, to the top level of the hierarchically structured function setting menu.

A fifth aspect of the invention provides a control method for an image formation device having a hierarchically structured function setting menu in which plural function setting items including a function setting item for an optional device are managed in a hierarchical structure, the hierarchically structured function setting menu being sequentially displayed according to the hierarchical structure to select a desired function setting item to perform a function setting, the control method including detecting, by a detector, whether or not the optional device is connected, and changing, by a changing unit, the function setting item for the optional device to a top level of the hierarchically structured function setting menu when the detector detects the connection of the optional device.

A sixth aspect of the invention provides the control method according to the fifth aspect of the invention, in which a determination unit of the changing unit may determine whether or not the function setting is performed for the optional device detected by the detector, the function setting item for the optional device being changed to the top level of the hierarchically structured function setting menu only when the determination unit determines that the function setting is not performed.

A seventh aspect of the invention provides the control method according to the fifth or sixth aspect of the invention, which may include deleting, by a setting information deleting unit, function setting information for the optional device when the optional device is disconnected.

An eighth aspect of the invention provides the control method according to one of the fifth to seventh aspects of the invention, in which, when the optional device is not connected, the changing unit may change function setting items for which the function setting is not performed in the hierarchically structured function setting menu, to the top level of the hierarchically structured function setting menu.

According to the image formation device and its control method of the above-mentioned embodiment of the present invention, it is easy to recognize the connection of an optional device to the image formation device.

If the function setting for the optional device connected to the image formation device is not performed, a screen is displayed to prompt the operator to perform the function settings for the optional device, whereby it is ensured that the function setting for the optional device is performed.

Even if an optional device connected to the image formation device is disconnected once and then connected again, it can be instantaneously checked on the operation panel whether or not the function setting for the optional device is performed, similarly to when the optional device is connected for the first time.

It further provides an effect that the operator is allowed to easily perform various function settings at the initial introduction of the image formation device.

The foregoing description of the embodiment of the present invention has been provided for the purpose of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-276557 filed on Sep. 22, 2005 including specification, claims, drawings and abstract is incorporated herein by reference in its entirety.

What is claimed is:

1. An image formation device, comprising:
    a storage management unit that stores and manages a function setting menu constructed in a hierarchical structure, the function setting menu consisting of a plurality of function setting items including a function setting item for one or a plurality of optional devices connectable to the image formation device;
    a detector that detects a connection of the one or the plurality of optional devices to the image formation device;

a first determination unit that determines whether a function setting item for an optional device, a connection of which to the image formation device is detected by the detector, has been set by an operator of the image formation device;

a changing unit that changes the hierarchical structure of the function setting menu stored and managed by the storage management unit to position the function setting item for the optional device at a top level of the hierarchical structure when a connection of the optional device is detected by the detector, and it is determined that the function setting item for the optional device has not been set by the first determination unit; and a display controller that sequentially displays and controls on a display each of the function setting items of the function setting menu based on the hierarchical structure for each function setting item so as to initially display the function setting item for the optional device positioned at the top level by the changing unit on the display prior to sequentially displaying other function setting items of the function setting menu on the display, wherein the function setting menu prompts, once the function setting item for the optional device is initially displayed, the operator of the image formation device to set the function setting item for the optional device and the operator sets the function setting item of the optional device in response to the prompt, wherein the first determining unit determines, when a plurality of the optional devices are detected to be connected to the image formation device by the detector, whether the function setting item for each of the plurality of the optional devices has been set, and the changing unit changes the hierarchical structure of the function setting menu stored and managed by the storage management unit to position, at the top level of the hierarchical structure, the function setting item for the each optional device detected by the detector for which the first determining unit determines that the function setting item has not been set.

2. The image formation device according to claim 1, further comprising:

a second determination unit that determines whether there is a function setting item which has not been set among a plurality of function setting items except the function setting item for the one or the plurality of optional devices stored and managed by the storage management unit when the connection of the one or the plurality of optional devices is not detected by the detector, wherein the changing unit changes the hierarchical structure of the function setting menu stored and managed by the storage management unit to position the functions setting item determined by the second determination unit that has not been set at a top level of the hierarchical structure.

3. The image formation device according to claim 1, further comprising:

a setting information deleting unit that deletes function setting information for the optional devices stored and managed by the storage management unit when an optional device is disconnected from the image formation device.

4. A control method for an image formation device displaying on a display function setting menu constructed in a hierarchical structure consisting of a plurality of function setting items including a function setting item for one or a plurality of optional devices connectable to the image formation device based on the hierarchical structure for each of the function setting items to perform a function setting, the control method comprising:

detecting a connection of the one or the plurality of optional devices to the image formation device;

determining whether a function setting item for an optional device, the connection of which is detected, has been set by an operator of the image formation device;

changing the hierarchical structure of the function setting menu to position the function setting item for the optional device at a top level of the hierarchical structure when a connection of the optional device is detected, and it is determined that the function setting item for the optional device has not been set; and sequentially displaying and controlling on a display the each function setting item for the function setting menu based on the hierarchical structure for the each function setting item so as to initially display the function setting item for the optional device positioned at the top level prior to sequentially displaying other function setting items of the function setting menu, wherein the sequentially displaying comprises prompting, once the function setting item for the optional device is initially displayed, the operator of the image formation device to set the function setting item for the optional device and the operator sets the function setting item of the optional device in response to the prompt, wherein the determining further comprises determining, when a plurality of optional devices are detected to be connected to the image formation device, whether the function setting item for each of the optional devices has been set, and the changing further comprises changing the hierarchical structure of the function setting menu to position, at the top level of the hierarchical structure, the function setting item for the each optional device detected to connected to the image formation device and for which connected optional device it is determined that the function setting item has not been set.

5. The control method according to claim 4, wherein the determining further comprises determining whether there is a function setting item which has not been set among a plurality of function setting items except the function setting item for the one or the plurality of optional devices when the connection of the one or the plurality of optional devices is not detected, and changing the hierarchical structure of the function setting menu to position the function setting item that has not bee set at a top level of the hierarchical structure.

6. The control method according to claim 4, further comprising:

deleting function setting information for the optional devices when an optional device is disconnected from the image formation device.

7. The control method according to claim 4, wherein the sequentially displaying further comprises prompting the operator, in another menu screen, to set the function setting item for the optional device.

8. The image formation device according to claim 1, wherein the display controller prompts the operator, in another menu screen, to set the function setting item for the optional device.

* * * * *